J. BRYANT
Seed-Planter.
No. 22,484.                                       Patented Jan. 4, 1859.
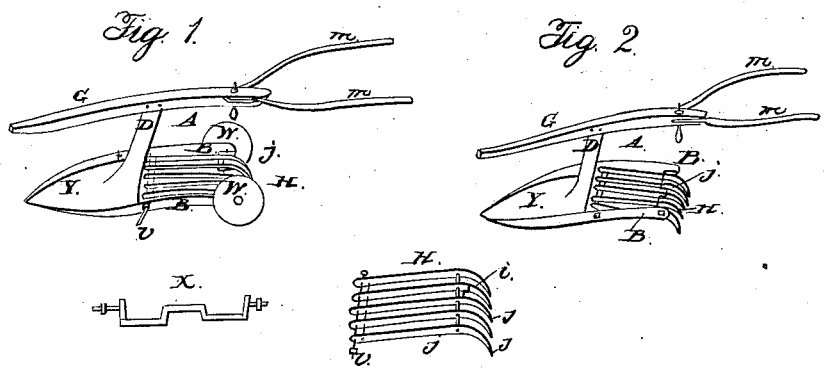
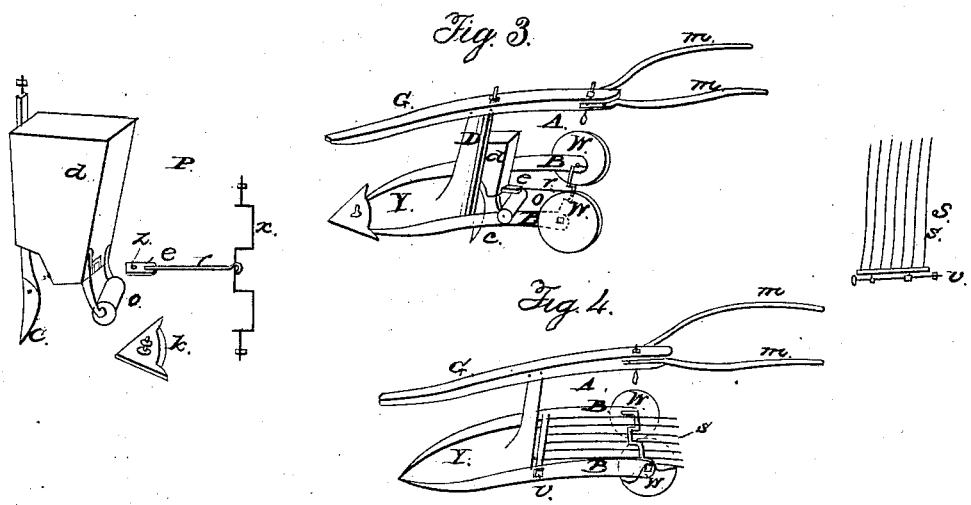
Witnesses
Phineas B. Sely
Charles Lich
Inventor
Joel Bryant

UNITED STATES PATENT OFFICE.

JOEL BRYANT, OF BROOKLYN, NEW YORK.

IMPROVEMENT IN SEED-PLANTERS.

Specification forming part of Letters Patent No. 22,484, dated January 4, 1859.

*To all whom it may concern:*

Be it known that I, JOEL BRYANT, of the city of Brooklyn, in the county of Kings and State of New York, have invented a new and Improved Mode of Constructing Cultivating-Plows in connection with a Seed-Planting Apparatus; and I hereby declare that the following is a full and correct description thereof, to wit:

The nature of my invention consists in providing cultivating-plows with a seed-planting apparatus, so that the said plows may be used either as a cultivator or as a seed-planter as occasion may require.

To enable others skilled in the art to make and use my invention, I will proceed more fully to describe the construction and operation of my improved cultivating-plow and seed-planter, reference being made to the accompanying drawings, and to the figures and letters marked thereon and forming a part of this specification.

I construct my said cultivating-plows A, Figs. 1, 2, and 3, with backward-extending side pieces, B B, or their equivalent, resting upon an eccentric axle, X, which is turned by wheels $w$ $w$, as hereinafter described, the said cultivating-plow A, Figs. 1, 2, and 3, being also provided with a draft-post, P, beam G, and handles $m$ $m$, as shown in Figs. 1, 2, 3, letter A.

In connection with the said cultivating-plow, A, Figs. 1, 2, 3, I provide and connect with the said plow A a seed-planting apparatus, P, consisting of a seed-box, $d$, seed-slide $e$, with its seed-hole $z$ and driving-rod $r$, as also with a drill-plow, $c$, a covering-wheel, $o$, and sod-clearer $k$, the said seed-planting apparatus P being set to the said cultivating-plow A, substantially as shown in Fig. 3 in the accompanying drawings.

When the said seed-planting apparatus P is disconnected from the said plow A, Figs. 1, 2, and 4, then the said plow A is used a cultivator for cultivating soil or crops when requiring the use of a cultivating-plow.

When the said cultivating-plow A is required for seed-planting then the said seed-planting apparatus P is attached to the said plow A, substantially as shown in Fig. 3, and the seed to be planted being put into the seed-box $d$, and the said plow A being drawn forward, the wheels $w$ $w$ turn the eccentric axle X, driving the rod $r$, so as to draw in and shove out from the said seed-box $d$ the seed-slide $e$, with hole $z$, receiving the seed from the said box $d$ in the said hole $z$, and carrying it out from the said box $d$. The said seed-slide $e$ drops the said seed just back of the drill-plow $c$, which opens the furrow for receiving it when the said covering-wheel $o$ presses the ground down upon the said seed, so as to cover it, and thus, substantially as above described, the said cultivating-plow A, when provided with its seed-planting apparatus P, operates as an efficient seed-planter.

Having now set forth the nature and object of my invention, I hereby disclaim the use of all other cultivating-plows and seed-planting apparatus, and desire to secure by Letters Patent what I hereby claim as my invention, to wit:

In connection with the cultivating-plow A, the seed-planting apparatus P, consisting of the drill-plow $c$, seed-box $d$, seed-slide $e$, driving-rod $r$, covering-wheel $o$, and sod-clearer $k$, the same being constructed and operating substantially as herein described, and for the purposes set forth.

J. BRYANT.

Witnesses:
 MELVILLE BRYANT,
 EDMUND SMITH.